United States Patent [19]
Stemme et al.

[11] 4,345,827
[45] Aug. 24, 1982

[54] DISTANCE-MEASURING SYSTEM WITH IN-RANGE SIGNALLING FOR USE WITH CAMERAS, ALARMS, AND THE LIKE

[75] Inventors: Otto Stemme, Munich; Peter Lermann, Naring; István Cocron, Munich, all of Fed. Rep. of Germany

[73] Assignee: AGFA-Gevaert Aktiengesellschaft, Leverkusen, Fed. Rep. of Germany

[21] Appl. No.: 188,600

[22] Filed: Sep. 19, 1980

[30] Foreign Application Priority Data

Sep. 27, 1979 [DE] Fed. Rep. of Germany ....... 2939139

[51] Int. Cl.³ .............................................. G03B 7/08
[52] U.S. Cl. ..................................... 354/25; 354/60 L
[58] Field of Search .................. 354/25 R, 25 A, 60 L

[56] References Cited

U.S. PATENT DOCUMENTS

| | | | |
|---|---|---|---|
| 4,129,366 | 12/1978 | Watanabe | 354/60 L |
| 4,221,474 | 9/1980 | Lermann et al. | 354/25 A |
| 4,230,400 | 10/1980 | Wick et al. | 354/60 L |
| 4,251,145 | 2/1981 | Cocron et al. | 354/25 A |
| 4,268,137 | 5/1981 | Cocron et al. | 354/25 |

*Primary Examiner*—Russell E. Adams
*Attorney, Agent, or Firm*—Michael J. Striker

[57] ABSTRACT

A distance measuring system generates an in-range signal when an object is located within a range of focus or a zone of protection, as the case may be. The system utilizes a single infrared transmitter and two receivers in order to determine the position of the object by triangulation.

16 Claims, 3 Drawing Figures

DISTANCE-MEASURING SYSTEM WITH IN-RANGE SIGNALLING FOR USE WITH CAMERAS, ALARMS, AND THE LIKE

CROSS-REFERENCES TO RELATED APPLICATIONS

This application contains subject matter which is common to two other commonly-owned applications. The first, which was filed on July 3, 1980, under the name of Cocron, has been assigned provisional Ser. No. 166,093. The second, which was filed on Apr. 9, 1979 under the name of Cocron et al, has been assigned Ser. No. 28,186 now U.S. Pat. No. 4,268,137. The entire disclosures of these two commonly-owned applications are hereby incorporated herein by reference as if fully set forth.

BACKGROUND OF THE INVENTION

This invention pertains to a distance-measuring system suitable for use with devices such as cameras, proximity detectors, and the like.

Such devices usually have a range of focus or range of operation within which presence of an object will be registered and outside which an object will not be detected. In applications such as proximity detectors which are designed to inform a user whether or not an intruder enters a protected zone, it would be advantageous to provide a distance-measuring system which would inform a user whenever such a zone was entered.

Moreover, since systems of this type may be used with a camera or other device which tracks distance within the zone precisely, it would be advantageous to provide a system of this type which informs a user whenever an object is located within a range of focus, while still permitting connection of ancillary switching circuitry which can be used to allow the camera to be automatically focussed.

Furthermore, it would be advantageous to provide a system of this type which would operate in such a fashion that the effects of high frequency noise would be eliminated, whereby false triggering of the system caused by noise would be eliminated.

SUMMARY OF THE INVENTION

These objects, among others which will become apparent hereinafter, are achieved in this invention by adapting previously existing circuitry such as is disclosed in the above-mentioned commonly owned patent applications to the special purposes with which this invention is concerned. As is already known, a triangulation system is utilized in which a single infrared transmitter transmits pulses which, after reflection from an object, are caused to be incident upon two receivers. If such incidence occurs simultaneously, a camera or other device will be properly focused. If such incidence does not take place simultaneously, the object will be within the range of focus of the camera or other device but refocusing will be required if the object is to be tracked exactly. If such incidence does not take place, the object is outside the range of focus. In this invention, signals appearing at the receivers are thus monitored to determine whether or not an object is within the range of focus, so as to enable a user to know whether or not, e.g., an intruder has entered a protected zone, two automobiles are too close together, a tank is filled to a predetermined level, and the like.

It is known that high frequency noise may interfere with the operation of a triangulation system such as that which has been disclosed in the above-mentioned commonly owned patent applications. As is already known, the outputs of the receivers, which outputs are in the form of pulses, are integrated in integrators in order to produce analog signals which may or may not exceed predetermined threshold values. In the event that such analog signals do exceed such threshold values, logically high digital input signals are generated. If the analog signals do not exceed the threshold values, logically low digital input signals are generated. In order to prevent high frequency noise from triggering the system, integration time within the integrator is so chosen that the integrators operate over a period which is approximately equal to an integral multiple of a period of an ac component in the high frequency noise. This causes the AC component to be substantially eliminated, leaving only a DC component which is sufficiently low relative to the threshold values chosen that noise will not interfere with the generation of the digital input signals.

Advantageously, time delays may be provided to link the distance-measuring system disclosed herein to other circuitry, so as to calibrate the response of the system to its intended application The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DETAILED DESCRIPTION OF PREFERRED EMBODIMENTS

Figure 1:
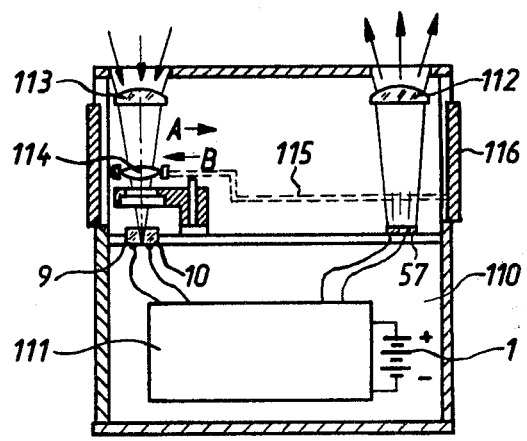
FIG. 1 is a schematic representation of the invention showing the transmitter, the receivers, and other elements associated therewith.

Referring first to FIG. 1, it can be seen that a housing 110 supports an infrared light-emitting diode 57, along with two infrared photodiodes 9 and 10. Infrared light-emitting diode 57 serves as a transmitter, while photodiodes 9 and 10 serve as receivers. Pulses of current passing through infrared light-emitting diode 57 serve to generate pulses of infrared light which pass through an optical system which may include one or more lenses and which is shown schematically as a single divergent lens 112 mounted on housing 110 and directing pulses of light from infrared light-emitting diode 57 out of housing 110 towards an object whose distance is to be measured.

In a similar fashion, an optical system shown schematically as a single convergent lens 113 is supported in housing 110 and causes pulses of infrared light reflected off the object to converge on a further optical system shown schematically as lens 114. Lens 114, as shown, has its optical axis oriented vertically, and can be shifted horizontally to the left or right as is indicated by arrows A and B in FIG. 1. Such movement of lens 114 is accomplished by adjustment of ring 116, which is linked to lens 114 by suitable mechanical linkage 115 which is shown schematically as a dotted line and is not set forth in detail.

When lens 114 is centrally positioned, its optical axis is aligned with lens 113 and with a line separating photodiodes 9 and 10, which are placed adjacent each other. Those skilled in the art will know that the ratio of reflected light incident upon photodiodes 9 and 10 can be varied by shifting lens 114 horizontally. Photodiodes 9 and 10 and infrared light-emitting diode 57 are all connected to a circuit which is powered by battery 1 and is shown schematically as block 111.

By adjustment of ring 116, lens 114 can be suitably shifted so as to define a range of focus, or a zone of protection as the case may be. In the event that an object is outside this range of focus or zone of protection, pulses of light from infrared light-emitting diode 57 will be so weak that they will not cause either photodiode 9 or photodiode 10 to conduct. In the event that an object is within the range of focus or zone of protection, pulses of light will be sufficiently strong that their incidence upon photodiodes 9 and 10 will be registered to cause at least one of photodiodes 9 or 10 to conduct. Thus, the presence or absence of an object within the range of focus or zone of protection can be ascertained by monitoring the outputs of photodiodes 9 and 10. Moreover, it is known that in the event this apparatus is used with, e.g., a camera, that unequal illumination between photodiodes 9 and 10 indicates both the existence of and the direction of improper camera focusing. Hence, it is not only possible to detect the presence or absence of an object within the range of focus or zone of protection, but it is additionally possible to utilize the outputs of photodiodes 9 and 10 to determine in which direction an automatic control system should adjust the camera objective in order to exactly track the position of the object and thereby bring it into focus, at which point photodiodes 9 and 10 will be illuminated equally. Hence, this invention can be used with an automatic-focus camera if desired.

Figure 2:
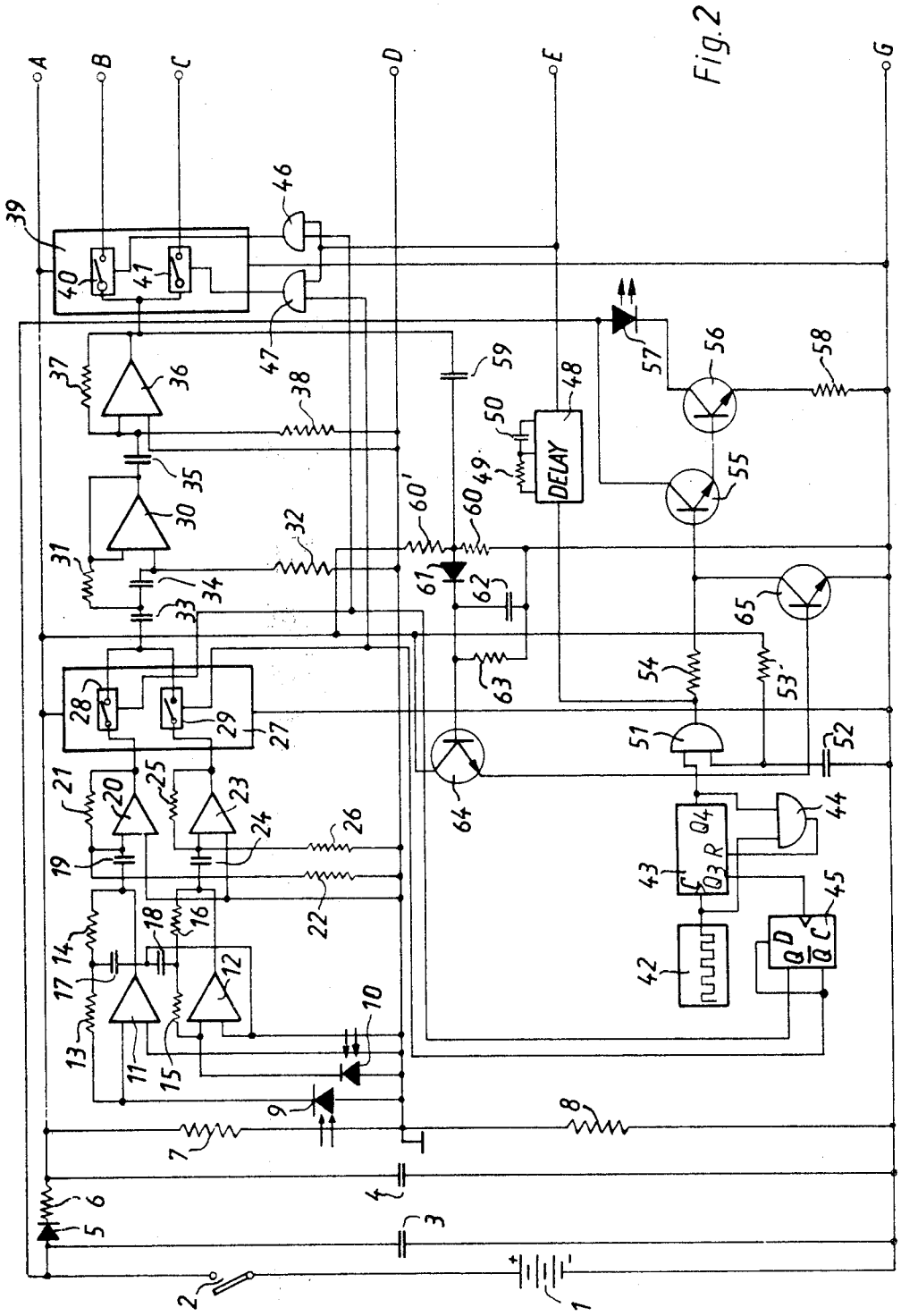
FIGS. 2 and 3 together form a schematic diagram of the circuitry shown within block 111 depicted in FIG. 1.

Referring now to FIG. 2, it can be seen that a battery 1 has its positive terminal connected to a single-pole single-throw switch 2 which serves as an on-off switch. A capacitor 3 is placed across both the battery 1 and switch 2, in order to serve as a voltage stabilizer. The anode of diode 5 is connected to one plate of capacitor 3 and one end of switch 2, and the cathode of diode 5 is connected to resistor 6. The end of resistor 6 which is remote from diode 5 is connected to one plate of capacitor 4, and the other plate of capacitor 4 is connected to the negative terminal of battery 1 and a plate of capacitor 3. It will be apparent to one skilled in the art that capacitors 3, 4 and diode 5 all serve the purpose of stabilizing the voltage of battery 1 for subsequent use. Two like resistors 7, 8 are placed in series with each other across capacitor 4 to form a voltage divider, with the centerpoint of the divider being grounded in order to provide two symmetrical voltage sources which can be used to drive the rest of the circuitry disclosed herein.

Operational amplifiers 11, 12, 20, 23 are all connected to the voltage supply which is defined by resistor 7 by power connections which have been omitted from FIG. 1. The inverting input of operational amplifier 11 is connected to the cathode of infrared photodiode 9. The anode of photodiode 9 is grounded. Likewise, the cathode of infrared photodiode 10 is connected to the inverting input of operational amplifier 12, while the anode of photodiode 10 is grounded. The output of operational amplifier 11 is fed back to the inverting input through a series network including resistors 13, 14 while the output of operational amplifier 12 is likewise fed back to the inverting input by means of a series network including resistors 15, 16. Preferably, resistors 13, 15 have like values, as do resistors 14, 16.

Like capacitors 17, 18 are connected in series with each other. Capacitor 17 is connected at one end to the common junction point of resistors 13, 14, while capacitor 18 is connected at one end to the common junction point between resistors 15, 16. Moreover, the common junction point of capacitors 17, 18 is connected to ground. The non-inverting inputs of operational amplifiers 11, 12 are both grounded.

Those skilled in the art will readily see that operational amplifiers 11, 12 are thus connected as amplifiers which have gains that increase with frequency of input signals applied to their inverting inputs, since the impedance of capacitors 17, 18 decreases with increasing frequency. Therefore, whatever AC voltages are developed across photodiodes 9, 10 will be amplified, respectively, by operational amplifiers 11, 12.

The output of operational amplifier 11 is connected to the inverting input of operational amplifier 20 through coupling capacitor 19. Likewise, the output of operational amplifier 12 is connected to the inverting input of operational amplifier 23 by coupling capacitor 24. The non-inverting inputs of operational amplifiers 20, 23 are grounded. In both cases, the outputs of operational amplifiers 20, 23 are fed back to their inverting inputs—in the case of operational amplifier 20, feedback takes place through resistor 21, while in the case of operational amplifier 23, feedback takes place through resistor 25, which has the same value as resistor 21. Resistor 22 connects the inverting input of operational amplifier 20 to ground, while resistor 26 connects the inverting input of operational amplifier 23 to ground. Resistors 22, 26 are of like values. It may thus be seen that operational amplifiers 20, 23 serve as AC amplifiers for the outputs of operational amplifiers 11, 12 respectively, and amplify AC signals developed across photodiodes 9, 10 respectively. In this connection, it will be noted that resistors 21, 22 cooperate to hold the gain of operational amplifier 20 at a constant value, while resistors 25, 26 perform the same function regarding operational amplifier 23.

The outputs of operational amplifiers 20, 23 are routed to a multiplexer 27 to be multiplexed for subsequent signal processing. Multiplexer 27 contains two switching elements 28, 29, which are so coordinated that either one or the other of them is closed. When switching element 28 is closed, the output from operational amplifier 20 is processed, while when switching element 29 is closed, the output from operational amplifier 23 is processed.

Such processing begins with a high-pass active filter which includes elements 30-34. The output of multiplexer 27 is routed to the non-inverting input of operational amplifier 30 through capacitors 33, 34, which are connected in series with each other. The non-inverting input of operational amplifier 30 is held off ground by resistor 32, while the common junction point of capacitors 33, 34 is connected to the inverting input of operational amplifier 30 via resistor 31. Finally, the output of operational amplifier 30 is connected to the inverting input of the operational amplifier.

The high-pass filter just described serves as an interference suppression network. As will be seen hereinafter, photodiodes 9, 10 are exposed to ambient light conditions, which ambient light conditions may include fluorescent lights and other light sources driven off local power lines. The purpose of the high-pass filter is to suppress low-frequency interference voltages which have frequencies equal to the first or second harmonic of line voltage, in order to make sure that interference of this type is eliminated as much as possible from the rest of the circuitry described herein.

The output of operational amplifier 30 is routed to the inverting input of operational amplifier 36 through capacitor 35. The non-inverting input of operational amplifier 36 is grounded, while the output of operational amplifier 36 is fed back to the inverting input by means of resistor 37. Moreover, resistor 38 biases the inverting input of operational amplifier 36 off ground.

Those skilled in the art will readily understand that operational amplifier 36 is thus connected as an AC amplifier for amplifying the output from the high-pass filter. This not only serves the purpose of amplifying the output from the high-pass filter, but additionally serves the purpose of keeping the DC component of the outputs of photodiodes 9, 10 within bounds so as to prevent ambient infrared sources from interfering with distance measurements.

The output of operational amplifier 36 is routed to a demultiplexer 39. Demultiplexer 39 contains switching elements 40, 41 which are in all ways analogous to switching elements 28, 29 in multiplexer 27. Moreover, as will be seen hereinafter, switching elements 28, 40 open and close together, as do switching element 29, 41. Thus, when switching elements 28, 40 are closed, the amplified AC component of the output of photodiode 9 will be present at point B in FIG. 2. Likewise, the amplified AC component of photodiode 10 will be routed to point C in FIG. 2 when switching elements 29, 41 are closed.

As will be seen hereinafter, it is important that the processing to which the outputs of photodiodes 9, 10 are subjected is exactly the same, whether photodiodes 9 or photodiode 10 is actually connected. By utilizing multiplexer 27 and demultiplexer 39, the filtering and DC component removal is accomplished by utilizing the same components, assuring uniformity in signal processing. Moreover, this structure results in a reduction in the number of components which are utilized in the system.

A square-wave pulse generator 42 is connected across resistor 8 by power connections, which are not shown. The output of pulse generator 42 is routed to the clock input of a counter 43, which is likewise powered by unshown power connections across resistor 8. Output Q3 of counter 43 is connected to the clock input of flip-flop 45. Finally, the $\overline{Q}$ output of flip-flop 45 is connected to its D input.

Flip-flop 45 is a D-type flip-flop. Whenever a pulse appears at the clock input of flip-flop 45, the logical state of the D input is reflected at the Q output. Moreover, the Q output and the $\overline{Q}$ output are always inverse to each other—when either output is logically high, the other output is logically low and vice versa.

Assuming for the moment that flip-flop 45 is in its reset state, i.e., is in a state in which the Q output is logically low and the $\overline{Q}$ output is logically high, it can be seen that when a clock pulse is received at clock input C that the states of outputs Q and $\overline{Q}$ will be interchanged—output Q will be brought logically high, while output Q will be brought logically low. Upon receipt of a subsequent clock pulse at clock input C, output $\overline{Q}$ will once again be brought logically high, while output Q will be brought logically low. Thus, as clock pulses are routed to clock input C of flip-flop 45, the logical states of outputs Q and $\overline{Q}$ will be successively interchanged.

Output Q of flip-flop 45 is connected to switching element 28 in multiplexer 27. Likewise, output $\overline{Q}$ of flip-flop 45 is connected to switching element 29 in multiplexer 27. Thus, as was mentioned above, as pulses from pulse generator 42 pass through counter 43 and are routed to clock input C of flip-flop 45, switching elements 28, 29 will be alternatively opened and closed in order to allow multiplexing to take place.

Resistor 53, which is placed in series with capacitor 52 across battery 1 when switch 2 is closed, keeps capacitor 52 charged and thus brings one input of AND-gate 51 logically high. As will be seen hereinafter, AND-gate 51 is used to drive infrared light-emitting diode 57. By connecting this input of AND-gate 51 in this fashion, the output at AND-gate 51 will remain logically low after closing of switch 2 until such time as pulse generator 42 has had a chance to stabilize at the proper frequency. After such time, that input of AND-gate 51 which is connected to resistor 53 and capacitor 52 will be brought logically high and kept there for the duration of all subsequent operations.

The other input of AND-gate 51 is driven by output Q4 of counter 43. Thus, the output of AND-gate 51 will be brought logically high after switch-on each time a pulse appears at output Q4 of counter 43. This output of AND-gate 51 is routed to the input of delay 48, in which resistor 49 and capacitor 50 are shown to constitute an RC time delay. The output of delay 48 is then routed to one input of each of AND-gates 46, 47. The unconnected output of AND-gate 46 is connected to output Q of flip-flop 45, while the unconnected input of AND-gate 47 is connected to output $\overline{Q}$ of flip-flop 45. Finally, the output of AND-gate 46 drives switching element 40 in demultiplexer 39, while the output of AND-gate 47 drives switching element 41 in demultiplexer 39.

The time constant of delay 48 causes switching elements 40, 41 in demultiplexer 39 to lag slightly behind their corresponding switching elements 28, 29 in multiplexer 27. Moreover, it will be seen that switching elements 28, 29 in multiplexer 27 are kept closed and open longer than their corresponding elements in demultiplexer 39. This eliminates the transmission of switching transients through the high-pass filter and the AC amplifier which process signals intermediate multiplexer 27 and demultiplexer 39. Finally, the output of pulse generator 42 is routed to an input of AND-gate 44, and output Q4 is connected to another input of AND-gate 44. The output of AND-gate 44 is routed to the reset input R of counter 43. This enables counter 43 to be reset after operation of demultiplexer 39.

Infrared light-emitting diode 57 is forward biased with its anode being connected to the hot side of battery 1 when switch 2 is closed. The cathode of light-emitting diode 57 is connected to the collector of transistor 56. The emitter of transistor 56 is connected to the cold side of battery 1 through resistor 58. Moreover, the base of transistor 56 is connected directly to the emitter of transistor 55, while the collector of transistor 55 is connected to the anode of light-emitting diode 57. It can thus be seen that a current amplifier is formed by transistors 55, 56, and that when pulses appear at the base of transistor 55, light-emitting diode 57 will be pulsed and will emit light in the infrared portion of the spectrum. Such pulses are made to appear at the base of transistor 55 because the output of AND-gate 51 is connected thereto by resistor 54. At this point, it can be seen that light-emitting diode 57 is pulsed briefly each time a pulse appears at output Q4 of counter 43.

The output of operational amplifier 36 is routed to a voltage divider composed of like resistors 60, 60' by means of a coupling capacitor 59. The common junction point of resistors 60, 60' is connected to the anode of diode 61. The cathode of diode 61 is connected to one plate of capacitor 62, and the other plate of capacitor 62 is connected to the common junction point between resistor 60 and the cold side of battery 1. Resistor 63 is placed in parallel with capacitor 62, and the base of transistor 64 is connected to the common junction point between the cathode of diode 61, a plate of capacitor 62, and one end of resistor 63. The collector of transistor 64 is connected to the hot side of resistor 7, while the emitter of transistor 64 is connected to the base of transistor 65. Finally, the collector of transistor 65 is connected to the base of transistor 55, while the emitter of transistor 65 is connected to the cold side of battery 1.

Transistors 64, 65, and the components associated with diode 61 form a control circuit which regulates the amount of current passing through light-emitting diode 57 when pulses appear at the output of AND-gate 51. Capacitor 62 serves as a storage capacitor which is charged through rectifier 61 in accordance with the output of operational amplifier 36. In turn, the charge across the plates of capacitor 62 governs the current flowing through the base-emitter circuit of transistor 64, which correspondingly varies the current flowing through the base-emitter circuit of transistor 65. As the output of operational amplifier 36 increases, more current is thus caused to flow in the base-emitter circuit of transistor 65, causing more current to be drawn through the collector of transistor 65 and thus diverted from passage through transistors 55, 56. Hence, as operational amplifier 36 produces a higher output, less current will be drawn through light-emitting diode 57. Conversely, as output of operational amplifier 36 decreases, less current flows through transistors 64, 65 and more current is available in order to drive light-emitting diode 57.

Light-emitting diode 57 can be mounted on a camera or other device in order to transmit pulses of radiation towards a subject. In the event that the device is properly focused, such pulses will arrive simultaneously at photodiodes 9, 10, and will produce outputs at photodiodes 9, 10 simultaneously. However, in the event that the device is improperly focused, one of photodiodes 9, 10 will be illuminated first, causing it to develop an output prior to the other one. Thus, by measuring the simultaneity with which photodiodes 9, 10 develop outputs, the state of focus of the device can be ascertained. As the device operates, the output of light-emitting diode 57 will be held constant, and a first received signal characterizing the output of photodiode 9 will appear at point B in FIG. 2 while a second received signal characterizing the output of photodiode 10 will appear at point C. Pulses generated by pulse generator 42 will appear, after a delay in delay 48, at point E. Points A, B, and G, will be, respectively, the hot power supply voltage, the ground, and the cold power supply voltage.

Figure 3:
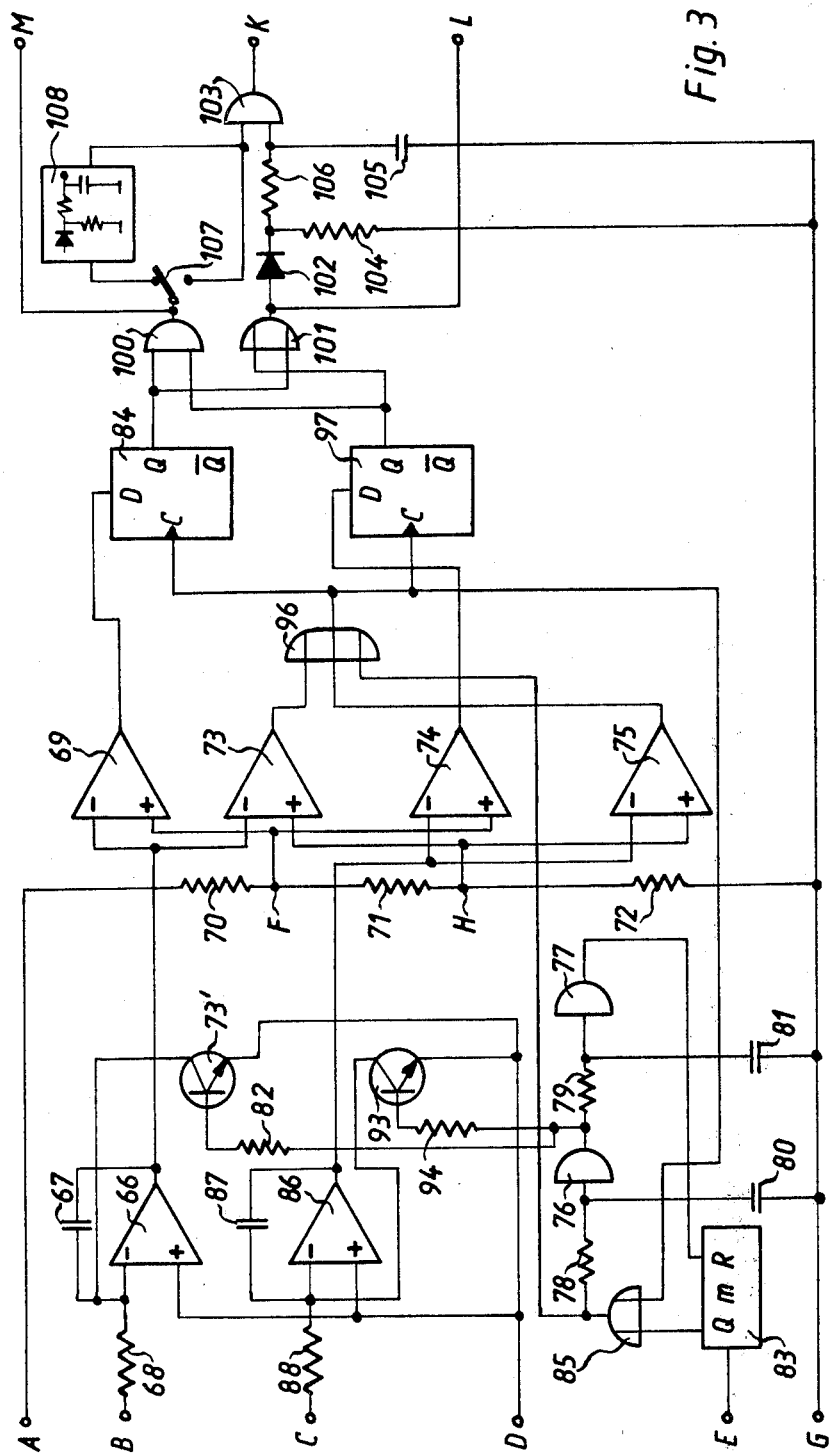

These points are also shown in FIG. 3. It will be understood that point A in FIG. 2 is connected to point A as shown in FIG. 3, and so forth. Therefore, FIGS. 2 and 3 form a unitary schematic diagram of the invention disclosed herein.

Operational amplifiers 66, 68 are powered across resistor 7 by appropriate connections which have been omitted from FIG. 3. Operational amplifier 66 is connected into the configuration of an integrator, since capacitor 67 bridges across its output and its non-inverting input. The non-inverting input of operational amplifier 66 is grounded, and it can therefore be seen that the first received signal which exists at point B will be integrated in a first integrator formed by operational amplifier 66 and capacitor 67, since this signal is introduced to the inverting input of operational amplifier 66 via resistor 68.

In exactly the same fashion, a second received signal existing at point C is routed to the inverting input of operational amplifier 86 via resistor 88, and operational amplifier 86 is also connected into a second integrator by capacitor 87, which bridges across the inverting input and the output. Therefore, the output at operational amplifier 67 is a time-integrated transformation of the first received signal, while the output of operational amplifier 86 is a time-integrated transformation of the second received signal. In order to ensure accuracy, resistors 68 and 88 are of like values, capacitors 67 and 87 are of like values, and operational amplifiers 66 and 86 are identical.

The first analog signal produced at the output of operational amplifier 66 is routed to the inverting inputs of operational amplifiers 69, 73. In exactly the same fashion, the second analog signal produced at the output of operational amplifier 86 is routed to the inverting inputs of operational amplifiers 74, 75. The non-inverting inputs of operational amplifiers 69, 74 are both connected to a reference voltage at point F, which is the uppermost tap on a voltage divider which includes resistors 70, 71, 72, and is placed across the hot and cold sides of battery 1. In a corresponding fashion, the non-inverting inputs of operational amplifiers 73, 75 are connected together at the lower tap of the voltage divider at point H.

It will be evident to those skilled in the art that as pulses received at points B and C are integrated, respectively, in the first and second integrators formed by operational amplifiers 66, 86, the first and second analog signals produced at the outputs of these operational amplifiers will steadily decrease. As this decrease takes place, the voltages appearing at the outputs of operational amplifiers 69, 73, 74, 75 will increase. Inasmuch as operational amplifiers 69, 74 are identical (as are operational amplifiers 73, 75), and inasmuch as point F is higher on the voltage divider than point H, the outputs of operational amplifiers 69, 74 will rise above zero prior to the time that the outputs of operational amplifiers 73, 75 do so.

Therefore, in the event that the device is properly focused, the outputs at operational amplifiers 69, 74 will rise above zero approximately simultaneously, while the outputs of operational amplifiers 73, 75 will also go above zero simultaneously, but will do so at a slightly later time. In the event that the camera is improperly focused, one of the outputs of operational amplifiers 69, 74 will be above zero while the other will be below zero, and the same relationship will hold true for the outputs of operational amplifiers 73, 75.

The signals at the outputs of operational amplifiers 69, 74 are used to drive subsequent circuitry, and this circuitry is all digital in nature. Therefore, since the magnitude of the outputs of operational amplifiers 69, 74 is subsequently irrelevant, the signals existing there can be denoted first and second digital input signals, respectively.

A ring counter 83 is connected to the output of time delay 48 at clock input C. Output Qm of ring counter 83 is connected to one input of OR-gate 85. The output of OR-gate 85 is connected both to an input of OR-gate 96 and to resistor 78. The end of resistor 78 which is remote from the output of OR-gate 85 is connected to the cold side of battery 1 via capacitor 80, and is also connected to the input of gate 76. Thus, it can be seen that resistor 78, gate 76, and capacitor 80 form a first stage in a time delay, since only after capacitor 80 charges sufficiently through resistor 78 will the input of gate 76 be brought logically high so as to bring its output logically high. The output of gate 76 is connected to three resistors: resistor 79, resistor 82, and resistor 94. Neglecting the latter two resistors for the moment, it can be seen that the end of resistor 79 which is remote from gate 76 is connected to ground via capacitor 81, and is also connected to the input of gate 77. In a similar fashion, it can be seen that resistor 79, gate 77, and capacitor 81 form a second stage in a time delay, since some time is required to charge capacitor 81 enough so that the input to gate 77 is logically high, bringing its output logically high. The output of gate 77 is connected to the reset input R of ring counter 83.

It was previously noted that the output of OR-gate 85 was connected to an input of OR-gate 96. The other two inputs to OR-gate 96 are connected, respectively, to operational amplifiers 73,75. The output of OR-gate 96 is connected, inter alia, to another input to OR-gate 85. It can thus be seen that when either one of the outputs of operational amplifiers 73, 75 go logically high, the output of OR-gate 96 will also go logically high. This, in turn, will bring the output of OR-gate 85 logically high, and will cause a pulse to appear first at the output of gate 76, and later at reset input R of ring counter 83, resetting the counter.

Transistor 73' is connected to shunt the inverting and non-inverting inputs of operational amplifier 66 through its collector-emitter circuit. Likewise, transistor 93 shunts the inverting and non-inverting inputs of operational amplifier 86 through its collector-emitter circuit. Transistor 73' can be turned on by current flowing through its base via resistor 82, while transistor 93 can be similarly turned on by current flowing through its base via resistor 94. Transistor 73', 93 are identical, as are resistors 82, 94.

It has been previously noted that resistors 82, 94 are connected to the output of gate 76, as is resistor 79. Thus, it can be seen that whenever either or both of operational amplifiers 73, 75 goes logically high, that either or both of transistors 73', 93 will be turned on and the inputs of either or both of operational amplifiers 66, 86 correspondingly shunted. Additionally, such shunting will take place prior to resetting of ring counter 83.

Hence, the circuitry in FIG. 3 which has just been described performs two separate sets of functions simultaneously. Firstly, first and second digital input signals are developed at the outputs of operational amplifiers 69, 74, which first and second digital input signals can be used later on to determine whether or not the device is properly focused, and if the device is not properly focused, the sense in which it should be rotated in order to focus it properly.

In addition, it will be clear that whenever such first and second digital input signals have been generated, one or the other of the outputs of operational amplifiers 73, 75 will also go positive. This will have the effect of cuasing first and second integrators formed by operational amplifiers 66, 86 to be shunted, causing their outputs to rise and cutting off the time-integrations performed therein. Thus, it will become apparent that a plurality of successive logically low and logically high states can be reflected at the outputs of operational amplifiers 69, 74 to enable the first and second digital input signals to be repeatedly generated. After the generation of a logically low or logically high state at either one of operational amplifiers 69, 74 (or both), a pair of first and second digital input signals are available for detection of congruence and noncongruence, and the circuit can be reset so as to enable another pair of such signals to be quickly developed.

It will be appreciated that high frequency noise will pass into the first and second integrators, since the highpass active filter which includes elements 30–34 allows such high frequency noise to pass through and operational amplifier 36 amplifies the output from the highpass filter. The first and second integrators are caused to operate in such a fashion that an integration period is defined which is approximately equal to an integral multiple of the period of the AC component in the high frequency noise. This will cause the effect of the AC component to be essentially eliminated, insulating subsequent circuitry from the effects of this AC component. Moreover, resistors 70, 71, and 72 are so chosen that the remaining DC component from the high frequency noise is small as compared with the threshold values biased into operational amplifiers 69, 73, 74, and 75. Thus, the remaining DC component is insufficiently high so as to cause the outputs of operational amplifiers 69, 73, 74, and 75 to go positive, which results in an effective insulation of the remaining circuitry from the effects of high frequency noise.

The output of operational amplifier 69 is connected to the D input of flip-flop 84, which like flip-flop 45 is a D-type flip-flop. In a similar fashion, the output of operational amplifier 74 is connected to the D input of flip-flop 97, which is also a D-type flip-flop. Thus, the first and second digital input signals can be registered in flip-flops 84, 97 respectively, whenever clock pulses are generated and introduced to the clock inputs C of flip-flops 84, 97.

Clock inputs C of flip-flops 84, 97 are connected to the output of OR-gate 96. Thus, whenever one of the outputs of operational amplifiers 73, 75 goes logically high, a secondary clock pulse is generated which first causes the first and second digital input signals to be registered in flip-flops 84, 97 respectively, and subsequently causes the first and second integrators to be shunted. (The term "secondary" is here used because pulse generator 42 is a primary clock-it can be seen that ring counter 83 is clocked only in response to clock pulses generated in pulse generator 42 and is therefore a secondary clock.)

It may thus be seen that the contents of flip-flops 84,97 can be used in order to determined whether or not the device needs to be refocused, and in the event that such refocusing is necessary, the contents of flip-flops 84, 97 can be used to determine the direction in which such refocusing should take place.

Each of the Q outputs of flip-flops 84 and 97 are connected to a corresponding input of AND-gate 100 and OR-gate 101. In the event that a logically high digital input signal has been clocked into either flip-flop 84 or flip-flop 97 or both, the output at OR-gate 101 will be brought logically high. Since the output of OR-gate 101 is connected to terminal L, it can be seen that OR-gate 101 serves the purpose of generating an in-range signal that indicates that an object is within the range of focus or zone of protection, as the case may be. This in-range signal can be used to trigger other circuitry (not shown) which is connected to terminal L.

In the event that both the first and second digital input signals clocked into flip-flops 84 and 97 are logically high, the output of AND-gate 100 will also be logically high. The output of AND-gate 100 is connected to terminal M. If terminal M is logically high, this signifies that the first and second digital input signals are congruent, so that a congruence signal so generated can be used to operate other circuitry (not shown) which is connected to terminal M.

The output of OR-gate 101 is connected not only to terminal L, but also to the anode of diode 102. The cathode of diode 102 is connected to the common junction point between resistors 104 and 106. That end of resistor 104 which is unconnected to the cathode of diode 102 is grounded, while that end of resistor 106 which is unconnected to the cathode of diode 102 is connected to one input of AND-gate 103 and to one plate of capacitor 105. That plate of capacitor 105 which is unconnected to an input of AND-gate 103 and resistor 106 is grounded.

When the output of OR-gate 101 is brought logically high, capacitor 105 is charged up through diode 102 and resistor 106. Thus, a logically high state at the output of OR-gate 101 will not be immediately reflected as a logically high state at an input of AND-gate 103, since a period of time determined by the RC time constant of capacitor 105 and resistor 106 will be required until such time as the voltage across capacitor 105 will be sufficient to bring one input of AND-gate 103 logically high. Moreover, in the absence of a logically high state at the output of OR-gate 101, capacitor 105 will discharge through resistors 104 and 106, causing an input of AND-gate 103 to go logically low after capacitor 105 has been sufficiently discharged.

The other input of AND-gate 103 can be either directly connected to the output of AND-gate 100 via single-pole double-throw switch 107, or can be indirectly connected thereto via second time delay 108, depending upon the setting of switch 107. Second time delay 108 has exactly the same circuit configuration as does the first time delay formed by diode 102, resistors 104 and 106, and capacitor 105, although the RC time constant in second time delay 108 may be different from the RC time constant of the first time delay, depending upon user requirements.

Thus, it can be seen that in the event that switch 107 is switched to the position shown in FIG. 3, the output at AND-gate 103 (which is connected to terminal K) will not be brought logically high until some period of time after the outputs of AND-gate 100 and OR-gate 101 are both brought logically high. After a first predetermined delay period, a logically high state at the output of OR-gate 101 will be reflected as a logically high state at one input of AND-gate 103, and this logically high state will remain for some period of time until capacitor 105 discharges through resistors 104 and 106, if such discharge is allowed to take place by virtue of a subsequent logically low state at the output of OR-gate 101. A second predetermined delay period likewise governs the appearance of a logically high state at the other input of AND-gate 103 after a logically high signal appears at the output of AND-gate 100. The first and second predetermined delay periods may be the same or different, depending upon user requirements. Of course, if switch 107 is switched to connect the output of AND-gate 100 to an input of AND-gate 103 directly, only the first predetermined delay period will be involved in causing the signal appearing at terminal K to be logically high.

Terminals K, L, and M may be connected to appropriate circuitry depending upon user requirements. These terminals may be connected to clocked flip-flops for subsequent processing. Advantageously, any of these terminals may be connected to an ignition circuit for an electronic flash, an indicator on a display, or any other suitable switching circuit. In the event that an object is within the range of focus or zone of protection, a logically high signal will appear at terminal L, so that a user can be informed by appropriate activation of an indicator or alarm that the object is detected. If this is the case, terminal K may be connected to a shutter control or like device to cause, e.g., a picture of an intruder to be taken. Likewise, terminal M can be connected to a shutter control or other suitable device.

If desired, a NOR-gate may be substituted for OR-gate 101. This will have the effect of causing capacitor 105 to be charged whenever an object is outside the range of focus or zone of protection, as the case may be. Thus, an in-range signal developed at terminal L will be logically high if OR-gate 101 is used, while an in-range signal at terminal L will be logically low if a NOR-gate is substituted for OR-gate 101. If a NOR-gate is used, terminal K will only be brought logically high in the event that an object come into the range of focus or zone of protection and congruence between the first and second digital input signals is achieved prior to discharge of capacitor 105.

Thus, the output stage formed by AND-gate 100, gate 101 (whether such gate be an OR-gate or a NOR-gate) and AND-gate 103 enables the presence or absence of an object within the range of focus or zone of protection to be ascertained, and allows other circuitry to be appropriately energized and deenergized. The logical states at terminals L and M can, if desired, be used to operate an automatic-focus system for a camera or like device.

It will be understood that each of the elements described above, or two or more together, may also find a useful application in other types of constructions differing from the types described above.

While the invention has been illustrated and described as embodied in a distance-measuring system with inrange signalling for use with cameras, alarms, and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a control system for use in cameras and the like which utilizes a clocked radiation transmitter for periodically emitting pulses of radiation with a fixed frequency, amplitude and pulse duration, like first and second radiation receivers receiving the pulses and generating first and second received signals corresponding thereto, and a signal processing network including two channels for processing the first and second received signals so as to reduce background radiation and noise, an improvement for converting the first and second received signals to digital signals and indicating when an object is located within a range of focus comprising: integrating means connected to the signal processing network and responding to the first and second received signals so as to produce first and second analog signals which are a time integrated transformation of the received signals; threshold means connected to said integrating means and having threshold values which are large as compared to pulse amplitude and a noise component, the threshold means operating in a manner that digital input signals are produced which are characteristic of said analog signals and being logically high when the analog signals exceed the threshold values and being logically low otherwise; storage means cooperating with said threshold means by storing said digital input signals and releasing the same in response to a pulse at the end of each measuring cycle of said transmitter; control means including logical AND or OR gating members having inputs connected to said storage means so as to produce an in-range signal only upon the occurrence of a logically high digital input signal, two RC timing circuits, an additional AND gate having an input selectively connectable to the output of said AND gating member either directly or via one of said RC timing circuits, and another input connected via the other RC timing circuit to the output of said OR gating member; and a first output terminal connected to the output of said OR gating member, a second output terminal connected to the output of said AND gating member, and a third output terminal connected to the output of said additional AND gate.

2. The improvement defined by claim 1, wherein the output stage includes a congruance monitor responsive to a condition in which both the first digital input signal and the second digital input signal are logically high simultaneously and generating a congruance signal in response thereto.

3. The improvement defined by claim 2, further including a first time delay delaying an in-range signal for a first predetermined delay period, and further including a second time delay delaying a congruance signal for a second predetermined delay period.

4. The improvement defined by claim 3, wherein the first time delay is connected to one input of a two input output gate and wherein the second time delay is connected to another input thereof, whereby when an in-range signal and a congruance signal are both generated, an output signal will be generated after said predetermined delay period.

5. The improvement defined by claim 1, further including a secondary clock a first clocked flip-flop into which the first digital input signal may be clocked by the secondary clock and a second clocked flip-flop into which the second digital input signal may be clocked by the secondary clock.

6. The improvement defined by claim 1 further comprising a first and second comparator stage; each of the first and second comparator stages includes a reset pulse generator operating in a manner that after a corresponding high digital input signal is generated by a comparator stage, a reset pulse is generated and routed to the threshold means for starting a subsequent time-integration.

7. The improvement defined by claim 5, wherein the secondary clock is a self-resetting ring counter driven by clock pulses which are used to clock the transmitter.

8. The improvement defined by claim 7, wherein the ring counter operates in a manner that the first and second means are always operated to start a subsequent time-integration prior to a resetting of the ring counter.

9. The improvement defined by claim 8, wherein the ring counter includes:
   a counter chip having a clocked input, an output and a reset input;
   an OR-gate having a first input connected to the output of the counter chip, a second input connected to both of the reset pulse generators, and an output;
   a first time delay stage having an input connected to the output of the OR-gate and an output connected to the first means and the second means; and
   a second time-delay stage having an input connected to the output of the first time-delay stage and an output connected to the reset input of the counter chip.

10. The improvement defined by claim 6, wherein the comparator stages each include a first operational amplifier and a second operational amplifier in parallel therewith, said operational amplifiers being so biased that for a given digital input signal, the first operational amplifier will produce an output prior to a production of an output by the second operational amplifier.

11. The improvement defined by claim 5, wherein the secondary clock is a self-resetting ring counter driven by clock pulses which are used to clock the transmitter.

12. The improvement defined by claim 11, wherein the ring counter operates in a manner that the first and second means are always operated to start a subsequent time-integration prior to a resetting of the ring counter.

13. The improvement defined by claim 12, wherein the ring counter includes:
   a counter chip having a clocked input, an output and a reset input;
   an OR-gate having a first input connected to the output of the counter chip, a second input connected to both of the reset pulse generators, and an output;
   a first time delay stage having an input connected to the output of the OR-gate and an output connected to the first means and the second means; and
   a second time-delay stage having an input connected to the output of the first time-delay stage and an output connected to the reset input of the counter chip.

14. The improvement defined by claim 6, wherein the secondary clock is a self-resetting ring counter driven by clock pulses which are used to clock the transmitter.

15. The improvement defined by claim 14, wherein the ring counter operates in a manner that the first and second means are always operated to start a subsequent time-integration prior to a resetting of the ring counter.

16. The improvement defined by claim 15, wherein the ring counter includes:

a counter chip having a clocked input, an output and a reset input;

an OR-gate having a first input connected to the output of the counter chip, a second input connected to both of the reset pulse generators, and an output;

a first time delay stage having an input connected to the output of the OR-gate and an output connected to the first means and the second means; and a second time-delay stage having an input connected to the output of the first time-delay stage and an output connected to the reset input of the counter chip.

* * * * *